United States Patent [19]

Rost et al.

[11] Patent Number: 4,583,450
[45] Date of Patent: Apr. 22, 1986

[54] COFFEE MACHINE

[75] Inventors: Kurt Rost, Sursee; Ueli Casty, Bern, both of Switzerland

[73] Assignee: Cafag AG, Sursee, Switzerland

[21] Appl. No.: 685,176

[22] Filed: Dec. 21, 1984

[30] Foreign Application Priority Data

Oct. 11, 1984 [CH] Switzerland ............... 4873/84

[51] Int. Cl.$^4$ ............................................. A47J 31/34
[52] U.S. Cl. ................... 99/279; 99/289 R; 99/297; 99/302 P
[58] Field of Search ............... 99/279, 280, 281, 282, 99/283, 289 R, 289 D, 297, 300, 302 P, 289 P, 290; 426/433

[56] References Cited

U.S. PATENT DOCUMENTS

| | | | |
|---|---|---|---|
| 3,103,873 | 9/1963 | Breitenstein | 99/289 R |
| 3,478,671 | 11/1969 | Fuqua | 99/283 |
| 3,485,162 | 12/1969 | Hopkinson | 99/283 |
| 4,188,863 | 2/1980 | Grossi | 99/289 R |

*Primary Examiner*—Robert W. Jenkins
*Attorney, Agent, or Firm*—Pollock, Vande Sande & Priddy

[57] ABSTRACT

A coffee machine comprises a boiling chamber, two pistons adjustable independently of each other and adapted to be pushed into the boiling chamber from opposite sides and defining between them a boiling space to hold and boil a predetermined quantity of powdered coffee, a source of boiling water having a through-flow heater and a boiling water pressure generator, and a hydraulic actuating device for the pistons having a pressurized medium circuit including a pressurized medium pump. The boiling water pressure generator is constituted by a media converter, of which one side is incorporated into the water supply to the boiling chamber while its other side is connectible to the pressurized medium pump.

8 Claims, 3 Drawing Figures

COFFEE MACHINE

BACKGROUND TO THE INVENTION

The invention relates to a coffee machine comprising a boiling chamber, two pistons adjustable independently of each other and adapted to be pushed into the boiling chamber from opposite sides and defining between them a boiling space to hold and boil a predetermined quantity of powdered coffee, a source of boiling water with a through-flow heater and a boiling water pressure generator and a hydraulic actuating device for the pistons with a pressurised medium circuit comprising a pressurised medium pump.

Conventional coffee machines of this type use their own boiling water pump as a means of generating boiling water pressure. This solution is relatively complicated both in terms of prime cost of the coffee machine and also in terms of the space required. Furthermore, such pumps are subject to a certain wear and tear, particularly if the water contains a high level of lime.

OBJECT OF THE INVENTION

An object of the invention is to provide a coffee machine of the type mentioned at the outset, which affords a keenly priced, space-saving and as far as possible maintenance-free arrangement for generating the boiling water pressure.

SUMMARY OF THE INVENTION

According to the invention, this problem is resolved in that the boiling water pressure generator is constituted by a media converter, one side of which is incorporated into the water supply flow to the boiling chamber while its other side is adapted to be connected to the pressurised medium pump.

Such a media converter can be of extremely simple construction which means that it can be produced at a low price. In addition, it is virtually maintenance-free and operates over long periods of time without any breakdown. In the coffee machine, therefore, only one pump is required, namely the pressurised medium pump of the hydraulic operating means, which is provided in any case for the pistons of the boiling chamber and, if need be, for ejection of the extracted powdered coffee.

Preferably, the media converter is disposed at a point along the water supply line which is upstream of the through-flow heater, so that it is only subject to the action of the cold inflowing water. This reduces the risk of calcification of the media converter if the water has a very high lime content. In addition, it is not absolutely necessary for the media converter to consist of materials suitable for temperatures close to the boiling point of water.

Preferably, the media converter consists of a container with a water chamber and a chamber to hold pressurised medium, the chambers being separated from each other by a pressure-transmitting element. In the case of an embodiment which is particularly simple in construction and manufacture, the pressure transmitting element is a resilient diaphragm. Currently, materials are known which comply with the severe requirements of the foodstuffs law and which also exhibit neutral response to hydraulic pressurised media.

Preferably, the media converter is so constructed that at least the part of the container wall which defines the pressurised medium chamber tapers towards the aperture provided for inlet of pressurised medium, the diaphragm being so shaped that when the pressurised medium chamber is in a pressureless state, it bears on its inside face. This is a particular advantage of the solution according to the invention since as the pressurised medium flows in, it is firstly only the surface corresponding to the cross-section of the inlet aperture for pressurised medium which is effective. As the diaphragm lifts away from the inside face of the container wall which surrounds the chamber provided for pressurised medium, the effective pressure area increases progressively until, in the end, it corresponds to the entire area of the diaphragm which is subject to the action of the pressurised medium. Consequently, the boiling water does not enter the boiling chamber abruptly at the maximum possible pressure but at a gradually increasing pressure. It has been demonstrated that the quality of the coffee brewed can be achieved if the pressure of the boiling water rises gradually. A corresponding control of a boiling water pump would necessitate an unevenly greater cost.

In the case of a preferred embodiment of media converter, the container consists of two hemispherical shells between which the diaphragm is clamped.

Emptying of the pressurised medium chamber and controlling of the supply of water and the discharge of water to and/or from the water chamber of the media converter can easily be achieved in that the water chamber is connected to a portion of the water supply line which is disposed between two non-return valves, these latter being so located that when the pressurised medium chamber of the media converter is subjected to the action of pressurised media, the non-return valve which is disposed upstream of the water chamber is closed while that which is disposed downstream is opened.

According to a further feature of the invention, disposed in the pressurised medium tank of the pressurised medium circuit are the pressurised medium pump and a heat exchanger through which passes the water supplying to the through-flow heater. In this way, on the one hand the pressurised medium pump or pressurised medium will be cooled while on the other the water flowing to the through-flow heater will be pre-heated. Consequently, it is possible to achieve a not inconsiderable saving on energy.

BRIEF DESCRIPTION OF DRAWINGS

Further features and advantages of the invention will become evident from the following description, which explains the invention with reference to an example of embodiment shown in the attached drawings, in which.

DESCRIPTION OF PREFERRED EMBODIMENTS

Figure 1:
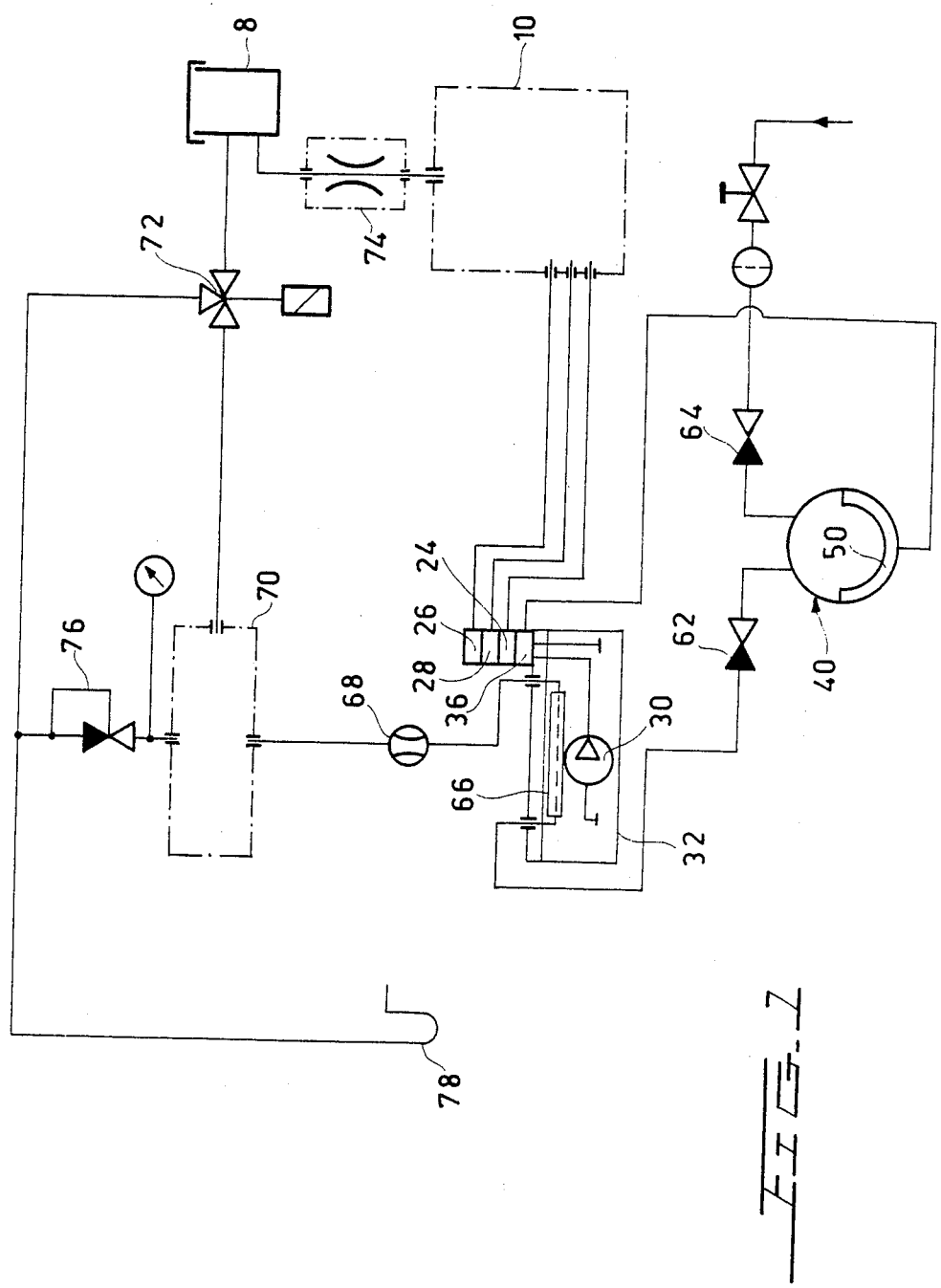
FIG. 1 is a diagrammatic representation of the pressurised medium circuit and shows the flow of boiling water in the coffee machine according to the invention.
Figure 2:
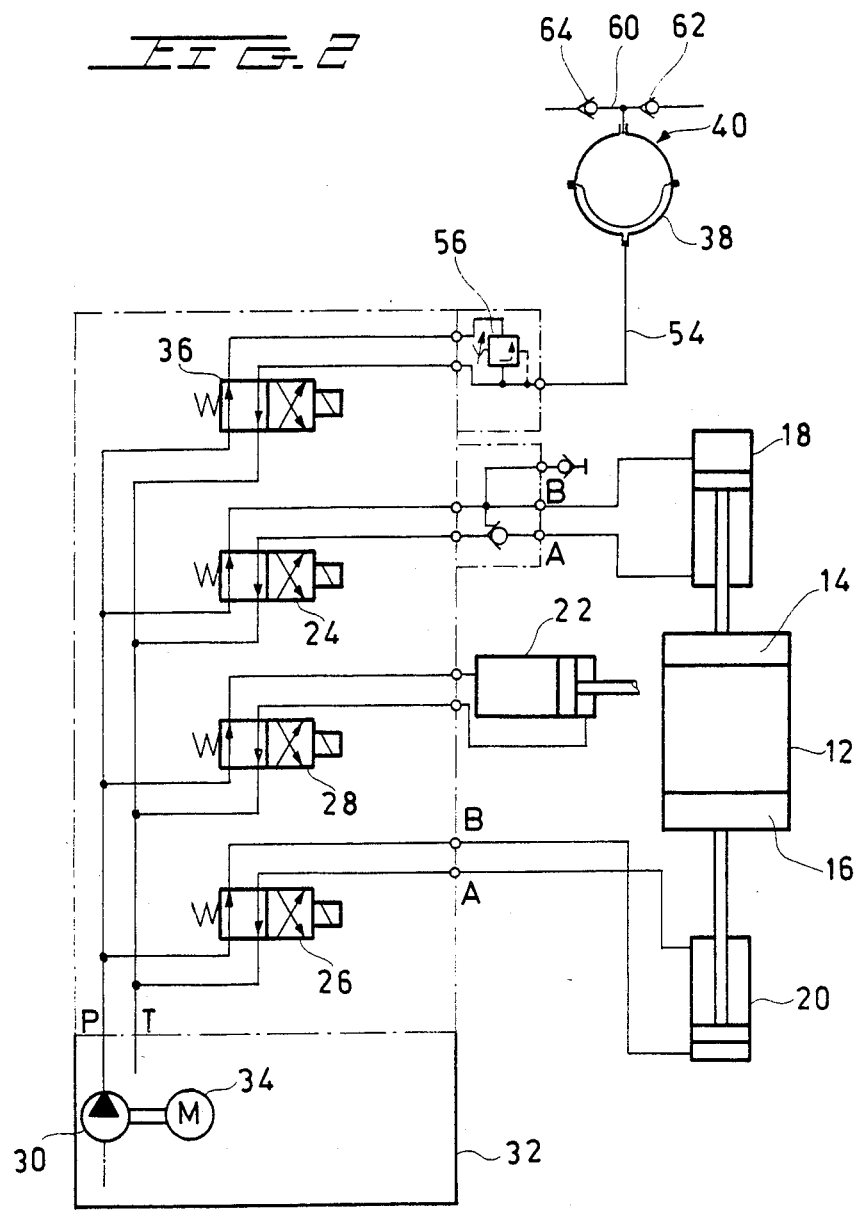
FIG. 2 is a detailed circuit diagram of the hydraulic actuating means in the coffee machine according to the invention.

In FIG. 1, reference numeral 10 generally denotes an automatic piston device of a coffee machine such as is described for example in Swiss Patent Specification No. 641 030. This automatic piston device is indicated in FIG. 2 in a very simplified view. It comprises a cylindrical boiling chamber 12 into the oppositely disposed axial ends of which it is possible to insert in each case a piston 14, 16, these pistons 14 and 16 being adjustable independently of each other by a working cylinder 18, 20. The piston 14 and the piston 16 enclose between them a boiling space into which the piston 14 introduces the boiling water and out of which the piston 16 discharges the coffee.

FIG. 2 also shows another working cylinder which actuates a pivot arm, not shown, which withdraws from the boiling chamber and feeds to a waste container the coffee filling which has been pressed into a tablet and exhausted. All these functions are described in detail in Swiss Patent Specification No. 641 030 so that they do not need to be explained in greater detail here. All three working cylinders 18, 20 and 22 are adapted to be connected to the pressure side of a pressurised medium pump 30 or pressurised medium tank 32 in each case via a separably operable multi-way valve 24, 26 and 28. The pressurised medium pump 30 is disposed inside the pressurised medium tank 32 and is driven by an electric motor 34.

Figure 3:
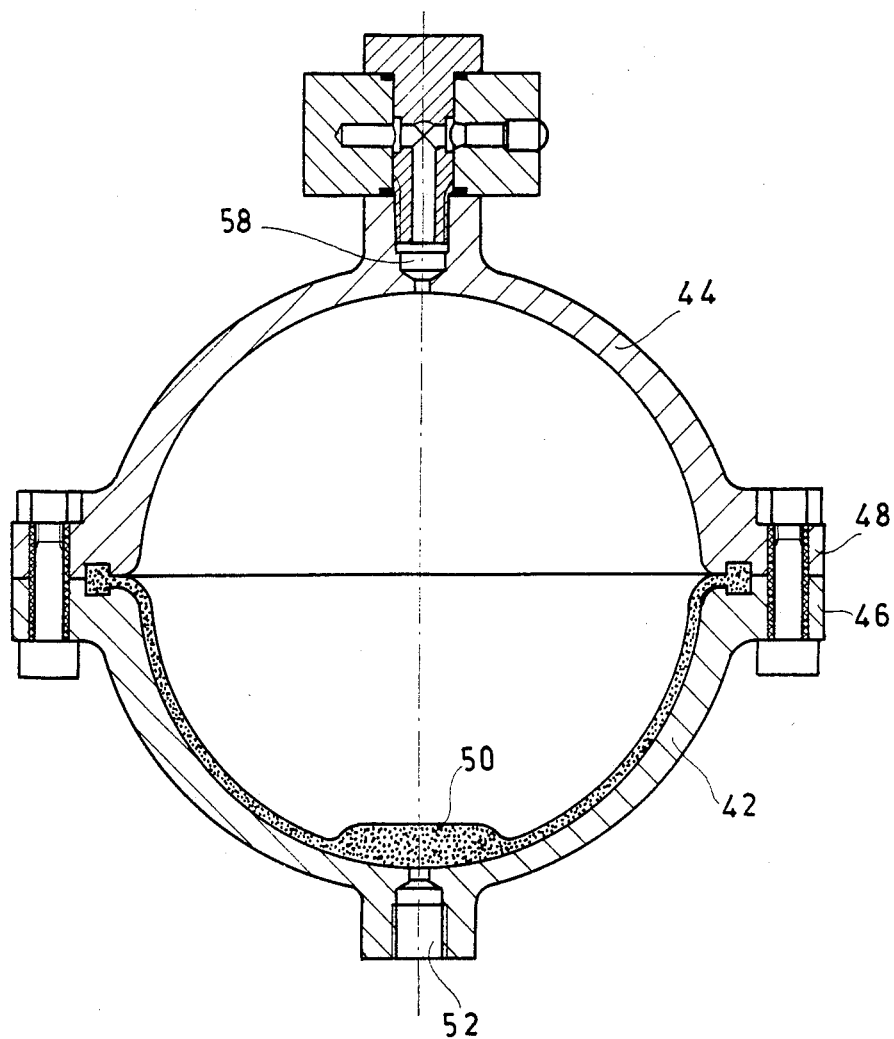
FIG. 3 is a cross-section through a media converter according to the invention.

The valve assembly which comprises the valves 24 to 28 also contains a further optionally operable multi-way valve 36 through which the pressure side of the pump 30 can be connected to the pressurised medium side 38 of a spherical media converter 40. This media converter consists according to FIG. 3 of two hemispherical shells 42 and 44 of which the encircling radial flanges 46, 48 are bolted to each other and between which there is stretched a resilient diaphragm 50 which, in the unladen state, bears against the inside face of the hemispherical shell 42 defining the pressurised medium chamber, as is shown in FIG. 3. The hemispherical shell 42 of the media converter 40 has a pressurised medium inlet 52 which is connected to the multi-way valve 36 through a line 54 and a pressure reducing valve 56 which is intended for adjustment of the boiling pressure.

The water chamber of the media converter 40, which is bounded by the diaphragm 50 and the hemispherical shell 44 of the media converter, is connected by a throughflow passage 58 to a portion 60 of the line leading from the water mains to the boiling chamber 12, this portion being located between two non-return valves 62 and 64 which are connected in the same sense so that when the boiling pressure is generated, the non-return valve 64 is closed in the direction of the mains while the non-return valve 62 is opened in the direction of the boiling chamber 12. As FIG. 1 shows, the boiling water flows through and is pre-heated in a heat exchanger 66 which is disposed in the pressurised medium tank 32. In this way, it disperses the heat generated by the various working processes and in particular by the pressurised medium pump 30 disposed in the pressurised medium tank 32. After it leaves the heat exchanger 66, the boiling water flows through a volume counter 68 before entering a throw-flow heater 70 from which it flows to a multi-way valve 72. From here, the boiling water passes through a restriction or orifice plate 74 to determine the throughflow resistance in the automatic piston device 10. The throughflow heater 70 is connected to a discharge 78 via a pressure limiting valve 76. Furthermore, the multi-way valve 72 permits of a connection between the automatic piston device 10 and the discharge 78 when the residual humidity is forced out of the exhausted powdered coffee so that it can be ejected into the waste container with the lowest possible moisture content.

Finally, FIG. 1 shows a container 8 for a cleaning agent with which the automatic piston device 10 can be cleaned at certain intervals.

If it is desired to use the coffee machine according to the invention in order to prepare coffee, then first of all in per se known manner a specific quantity of coffee is ground and placed in the brewing chamber. When the brewing chamber is closed by the pistons 14 and 16, the piston 14 supplies boiling water. To this end, the valve 36 is opened so the pressurised medium flows through the pressurised medium inlet 52 into the pressurised medium chamber of the media converter 40. As FIG. 3 shows, initially all that acts on the diaphragm 50 is a force corresponding to the cross-section of the pressurised medium inlet 52 at the diaphragm 50. Only when the diaphragm 50 lifts off the inner wall of the hemispherical shell 52 does the effective pressure area increase, finally occupying the complete cross-sectional area of the free portion of the diaphragm 50 which is held firmly in place. In this way, the boiling water in the media converter is not abruptly and at full pressure forced into the brewing chamber 12 of the automatic piston device 10 but gradually and with a progressively increasing pressure. When this happens, the check valve 64 disposed upstream of the media converter 40 is closed while the check valve 62 disposed downstream of the media converter 40 is opened. When the media converter is completely emptied and the pressurised medium chamber of the media converter 40 is connected to the pressurised medium tank 32, then water flows out of the water mains into the water chamber of the media converter 40 and presses the diaphragm 50 back into the position shown in FIG. 3. The check valve 62 is closed.

The solution according to the invention is less expensive to manufacture, more economical in operation and requires less maintenance than the conventional solutions.

We claim:
1. A coffee machine comprising:
 (a) a boiling chamber having water supply means,
 (b) two pistons adjustable independently of each other and adapted to be pushed into the boiling chamber from opposite sides and defining between them a boiling space to hold and boil a predetermined quantity of powdered coffee,
 (c) a source of boiling water having a through-flow heater and a boiling water pressure generator, and
 (d) a hydraulic actuating device for the pistons having a pressurised medium circuit including a pressurised medium pump, and a pressurized medium tank,
 (e) said boiling water pressure generator being constituted by a media converter of which one side is incorporated into the water supply means to the boiling chamber while its other side is connectible to the pressurised medium pump.

2. A coffee machine according to claim 1, wherein the media converter is disposed at a point in the water supply line which is disposed upstream of the throughflow heater.

3. A coffee machine according to claim 1, wherein the media converter is constituted by a container having a water chamber and a chamber for pressurised medium which are separated from each other by a pressure transmitting element.

4. A coffee machine according to claim 3, wherein the pressure transmitting element is constituted by a resilient diaphragm.

5. A coffee machine according to claim 4, wherein at least the part of the container wall which bounds the pressurised medium chamber of the media converter tapers towards the aperture for inlet of pressurised medium and in that the diaphragm is so shaped that in the pressureless condition of the pressurised medium chamber, it bears on the inside face thereof.

6. A coffee machine according to claim 4, wherein the container is constituted by two hemispherical shells between which the diaphragm is clamped.

7. A coffee machine according to claim 1, wherein the water chamber of the media converter is connected to a portion of the water supply line which is disposed between two check valves, the check valves being so located that when the pressurised medium chamber of the media converter is subjected to the action of pressurised medium, the check valve disposed upstream of the water chamber is closed while the check valve disposed downstream is opened.

8. A coffee machine according to claim 1, wherein disposed in the pressurised medium tank are the pressurised medium pump and a heat exchanger through which flows the water which is being fed to the throughflow heater.

* * * * *